United States Patent
Okamoto

(10) Patent No.: US 11,345,035 B2
(45) Date of Patent: May 31, 2022

(54) CONTROL SYSTEM OF INDUSTRIAL ROBOT

(71) Applicant: FANUC CORPORATION, Yamanashi (JP)

(72) Inventor: Takahiro Okamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 196 days.

(21) Appl. No.: 16/810,224

(22) Filed: Mar. 5, 2020

(65) Prior Publication Data
US 2020/0282562 A1 Sep. 10, 2020

(30) Foreign Application Priority Data

Mar. 7, 2019 (JP) .............................. JP2019-041579

(51) Int. Cl.
*B25J 9/16* (2006.01)
*B25J 19/06* (2006.01)
*B25J 19/00* (2006.01)

(52) U.S. Cl.
CPC ............. *B25J 9/1674* (2013.01); *B25J 9/163* (2013.01); *B25J 9/1664* (2013.01); *B25J 19/0004* (2013.01); *B25J 19/06* (2013.01)

(58) Field of Classification Search
CPC ........ B25J 9/1674; B25J 9/163; B25J 9/1664; B25J 19/0004; B25J 19/06; G05B 2219/36473
See application file for complete search history.

(56) References Cited

U.S. PATENT DOCUMENTS

2016/0082593 A1* 3/2016 Inagaki .................. B25J 9/1676
  700/255
2016/0129598 A1  5/2016 Geiler et al.
(Continued)

FOREIGN PATENT DOCUMENTS

JP    S54-141971 A    11/1979
JP    S58-203521 A    11/1983
(Continued)

OTHER PUBLICATIONS

An Office Action; "Notice of Reasons for Refusal", mailed by the Japanese Patent Office dated Apr. 27, 2021, which corresponds to Japanese Patent Application No. 2019-041579 and is related to U.S. Appl. No. 16/810,224; with English language translation.

*Primary Examiner* — Robert T Nguyen
(74) *Attorney, Agent, or Firm* — Studebaker & Brackett PC

(57) ABSTRACT

Provided is a control system of an industrial robot that enables a robot to be stopped safely while reducing a load on a mechanical unit and avoiding interference with the peripheral environment when a command for which an excessive load is applied to the mechanical unit of the robot is received. A control system of an industrial robot includes: a setting unit configured to set in advance a first threshold value, a second threshold value smaller than the first threshold value, and a grace time; a determination unit configured to determine whether a command signal for controlling a robot has exceeded the first threshold value or the second threshold value; and a control unit configured to, in a case in which the command signal is determined as exceeding the second threshold value by the determination unit, continues the control according to the command only during the period until a grace time elapses since exceeding the second threshold value, and stop the robot at a timing at which an (Continued)

operation speed of the robot becomes equal to or less than a predetermined operation speed that is determined in advance.

4 Claims, 3 Drawing Sheets

(56) References Cited

U.S. PATENT DOCUMENTS

| | | | |
|---|---|---|---|
| 2017/0144300 A1* | 5/2017 | Oumi | B25J 9/1676 |
| 2018/0093378 A1* | 4/2018 | Yamamoto | B25J 13/085 |
| 2018/0257232 A1* | 9/2018 | Yamamoto | B25J 9/1676 |

FOREIGN PATENT DOCUMENTS

| | | |
|---|---|---|
| JP | S61-070612 A | 4/1986 |
| JP | S61-147306 A | 7/1986 |
| JP | S61-206007 A | 9/1986 |
| JP | 2003-025271 A | 1/2003 |
| JP | 2009-023048 A | 2/2009 |
| JP | 2013-528121 A | 7/2013 |
| JP | 2015-217468 A | 12/2015 |
| JP | 2016-064448 A | 4/2016 |
| JP | 2017-024137 A | 2/2017 |
| JP | 2017-100200 A | 6/2017 |

* cited by examiner

CONTROL SYSTEM OF INDUSTRIAL ROBOT

This application is based on and claims the benefit of priority from Japanese Patent Application No. 2019-041579, filed on 7 Mar. 2019, the content of which is incorporated herein by reference.

BACKGROUND OF THE INVENTION

Field of the Invention

The present invention relates to a control system of an industrial robot.

Related Art

Normally, in the control of an industrial robot, a user specifies a condition (a target position, a motion type, an operation speed, etc.) for each line in a teaching program, and then, the robot interprets each line of the teaching program, and moves while automatically interpolating the position for each control period from the current position to the target position so as to satisfy the specified condition.

On the other hand, in some cases, the user generates and specifies the interpolation position for each control period, and the robot motion is controlled according to this command.

At this time, if a command for each control period generated by the user is such that an excessive load is applied to a mechanical unit such as a control axis of the robot, there is a risk of damage to the mechanical unit or breakage of the mechanical unit occurring. Therefore, the allowable upper limit value is set in advance for acceleration, jerk, etc. for each control axis, the command is monitored, and if a command in which the acceleration or jerk for each control axis exceeds the allowable upper limit value, perform emergency stop of the robot issuing an alarm to protect the mechanical unit of the robot (for example, Japanese Unexamined Patent Application (Translation of PCT Application), Publication No. 2013-528121).

Patent Document 1: Japanese Unexamined Patent Application (Translation of PCT Application), Publication No. 2013-528121

SUMMARY OF THE INVENTION

However, in the control system of the above-described conventional industrial robot, when a command exceeding the allowable upper limit value is received from a user, the robot moving at a certain speed or more will be stopped in emergency. At this time, the emergency stop itself will cause an excessive load on the robot and, for example, by repeatedly performing such control over a long period of time, there is a risk of causing premature failure of the robot.

On the other hand, in order to stop the robot smoothly, it is conceivable to automatically generate a trajectory to the stop position; however, if the trajectory of the robot automatically generated within the range of the constraints of acceleration and jerk deviates from the trajectory specified by the user, it may interfere with the surrounding environment and lead to material damage accidents, etc.

Therefore, a technique and a method are strongly desired that enables the robot to stop safely while reducing the load on the mechanical unit as much as possible when a command to apply an excessive load to the mechanical unit of the robot is received.

According to an aspect of the present disclosure, a control system of an industrial robot includes: a setting unit configured to set in advance a first threshold value, a second threshold value smaller than the first threshold value, and a grace time; a determination unit configured to determine whether a command signal for controlling a robot has exceeded the first threshold value or the second threshold value; and a control unit configured to, in a case in which the command signal is determined as exceeding the second threshold value by the determination unit, stop the robot at a timing at which an operation speed of the robot becomes equal to or less than a predetermined operation speed that is determined in advance, during a period until a grace time elapses since exceeding the second threshold value.

According to an aspect of the present disclosure, when a command signal such as acceleration or jerk of the robot based on a command has exceeded a second threshold, motion control based on a user's command is continued until a grace time has elapsed, and when the robot is decelerated to a predetermined operation speed during the control, the robot is stopped at this timing. This makes it possible to safely stop the robot without interfering with the surrounding environment, while minimizing the load on the mechanical unit when a command is received which applies an excessive load on the mechanical unit such as the control axis of the robot.

DETAILED DESCRIPTION OF THE INVENTION

Hereinafter, a description will be given of a control system of an industrial robot according to an embodiment with reference to FIGS. 1 to 3.

A control system of an industrial robot according to the present embodiment performs control for intentionally differentiating the timing at which a command from a user exceeds an allowable upper limit value such as acceleration and jerk from the timing of actually stopping the robot, when a position command in which an excessive load is applied to the mechanical unit such as a control axis of the robot (industrial robot) is detected, to thereby safely stop the robot while preventing the excessive load from being applied to the mechanical unit.

Figure 1:
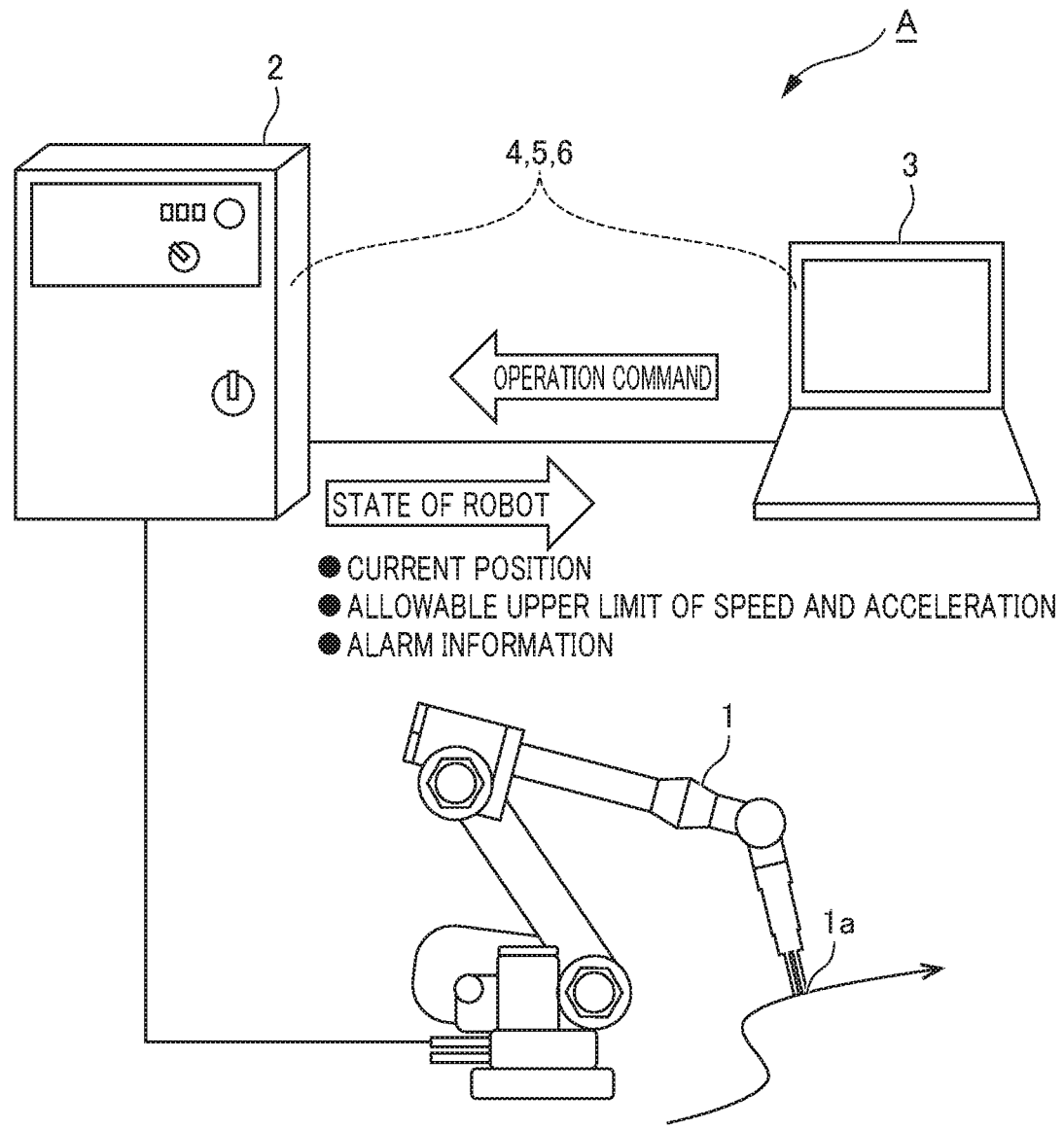
FIG. 1 is a diagram showing a control system of an industrial robot according to an embodiment.

More specifically, as shown in FIG. 1, a control system A of the industrial robot according to the present embodiment includes a robot controller 2 for controlling the motion (driving) of the robot 1.

For example, the robot controller 2 is connected through a communication network with an external computer 3, receives a command from the external computer 3 through a user operation or the like, and transmits to the external computer 3 the current position of the robot 1, an allowable upper limit such as speed, acceleration, or jerk, alarm information, and the like.

Furthermore, the external computer 3 generates an operation command on the basis of the received information of the current location or the allowable upper limit values for speed, acceleration, jerk, etc. of the robot 1, and transmits the operation command to the robot controller 2. The robot controller 2 performs motion control of the robot 1 on the basis of the information of the operation command.

On the other hand, the control system A of the industrial robot according to the present embodiment includes: the robot controller 2; a setting unit 4 that sets a first threshold value, a second threshold value smaller than the first threshold value, and a grace time; a determination unit 5 for determining whether a command signal for controlling the robot 1 has exceeded the first threshold value or the second threshold value, and a control unit 6 that, in a case in which the command signal is determined as exceeding the second threshold value by the determination unit 5, stops the robot 1 at a timing at which an operation speed which is the spatial speed of a tool-tip 1a of the robot 1 becomes equal to or less than a predetermined operation speed that is determined in advance until a grace time has elapsed, and performs emergency stop of the robot 1 immediately in a case in which the command signal is determined as exceeding the first threshold value.

Here, the robot 1 performs an operation such as picking up a workpiece or placing a workpiece in the range of the operation of the general application. Therefore, it is desirable for the operation speed, which is the spatial speed of the tool-tip 1a of the robot 1, to be a predetermined operation speed that can stop the robot 1 safely without applying an excessive load on a mechanical unit such as a plurality of control axes when controlling to stop the robot 1 during the period until the grace time elapses since exceeding the second threshold value. That is, it suffices if the grace time has a time period for only exceptional cases in which, for example, the robot 1 continues to operate for a long time without decelerating to a predetermined operation speed or less. In other words, it suffices if the grace time is appropriately set to a value (time) that is considered slightly longer as the time period for the robot 1 to continue to move at a predetermined operation speed or more. For example, the grace time is about 5 seconds.

Although the operation speed, which is the spatial speed of the tool tip 1a of the robot 1, is basically obtained by calculating it from the command value, it may be obtained by a sensor installed in the robot 1. Furthermore, as shown in FIG. 3, the maximum operating speed of the robot 1 is, for example, about 4000 m/s, and the operation speed suitable for stop the robot 1 smoothly and safely may be, for example, about 150 m/s (for example, about 5% speed of the maximum speed).

Furthermore, in the control system A of the industrial robot of the present embodiment, the first threshold value and the second threshold value are set for each control axis of the mechanical unit of the robot 1, and the determination unit 5 is configured to notify the control axis that has exceeded the second threshold value upon controlling to stop the robot 1 by the determination of the determination unit 5.

The control unit 6 performs emergency stop of the robot 1 when it is determined by the determination unit 5 that the command signal has exceeded the first threshold value, and when the grace time has elapsed after the command signal has exceeded the second threshold. That is, the present embodiment provides a time for performing emergency stop of the robot 1 immediately preferentially to applying an excessive load on the mechanical unit of the robot 1.

Figure 2:
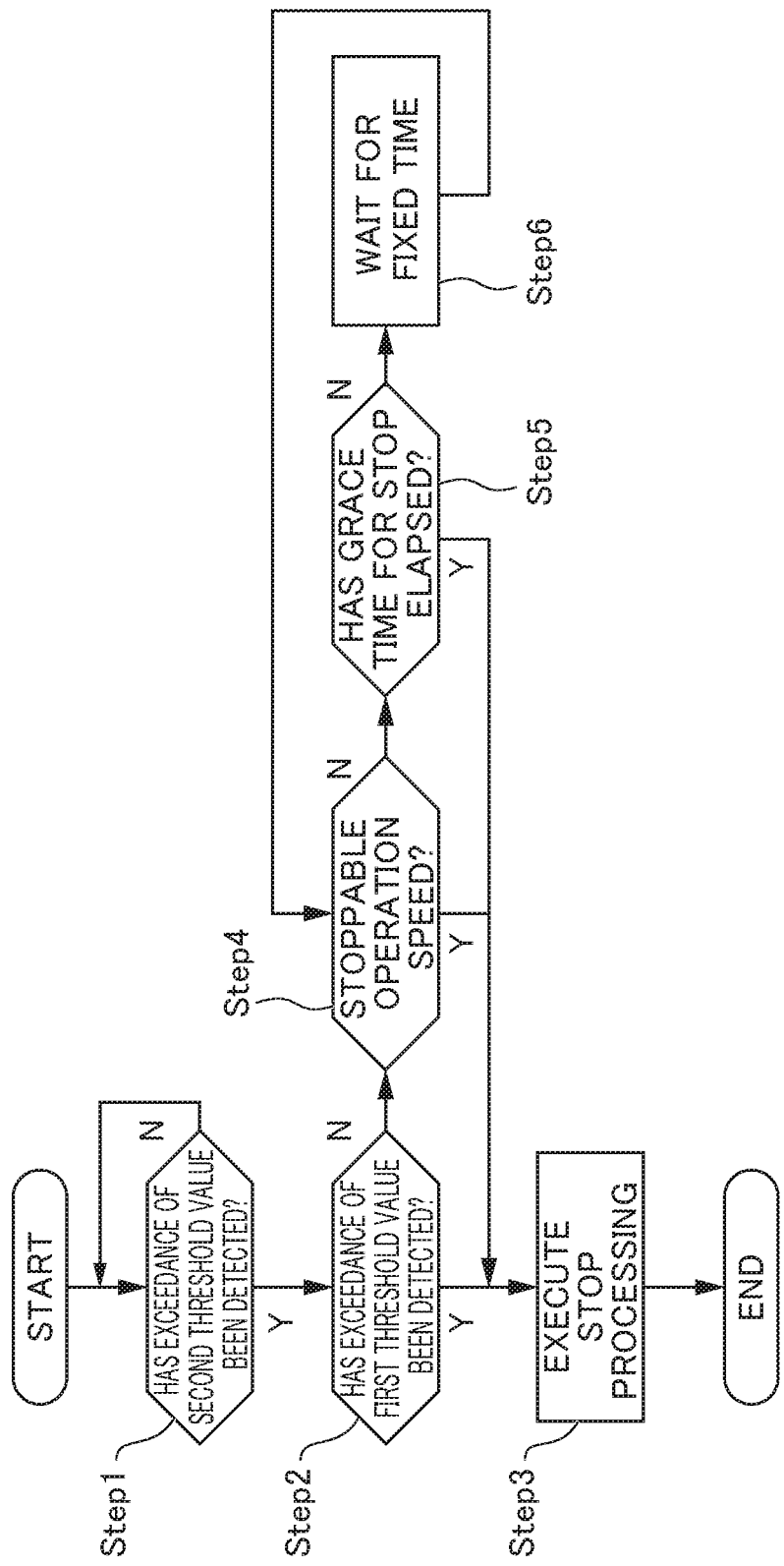
FIG. 2 is a diagram showing a control flow of an industrial robot according to an embodiment.

In the control system A of the industrial robot according to the present embodiment, the interpolated position for each control period normally generated by the robot is generated and specified by the user, and when the motion of the robot is controlled according to this command, as shown in FIG. 2 (and FIG. 3), the determination unit 5 calculates, for each control period, the acceleration of each control axis, etc. from the command value and the previous command value, and determines whether or not the second threshold value has been exceeded (Step 1).

The determination unit 5 determines whether the first threshold value has been exceeded, when the second threshold value has been exceeded (Step 2).

When the exceedance of the first threshold value is detected by the determination unit 5, the control unit 6 executes stop processing (Step 3), and immediately performs emergency stop of the robot 1 preferentially to applying an excessive load on the mechanical unit of the robot 1. In addition, an alarm is issued.

Furthermore, in the present embodiment, when the exceedance of the second threshold value is detected by the determination unit 5, and the exceedance of the first threshold value is not detected, the preset grace time begins to be measured. Thereafter, until the grace time has elapsed, the control unit 6 receives information of the operation speed of the robot 1, checks whether the operation speed is a predetermined operation speed suitable for stop so that an excessive load is not applied to the mechanical unit of the robot 1 every few milliseconds (Step 4, Step 5, and Step 6), and executes stop processing of the robot 1 at a timing of a predetermined operation speed suitable for the stop (Step 3).

Herein, in a case in which the operation speed is not changed to the predetermined operation speed during the period until the grace time has elapsed (Step 5), the stop processing is immediately executed (Step 3).

Figure 3:
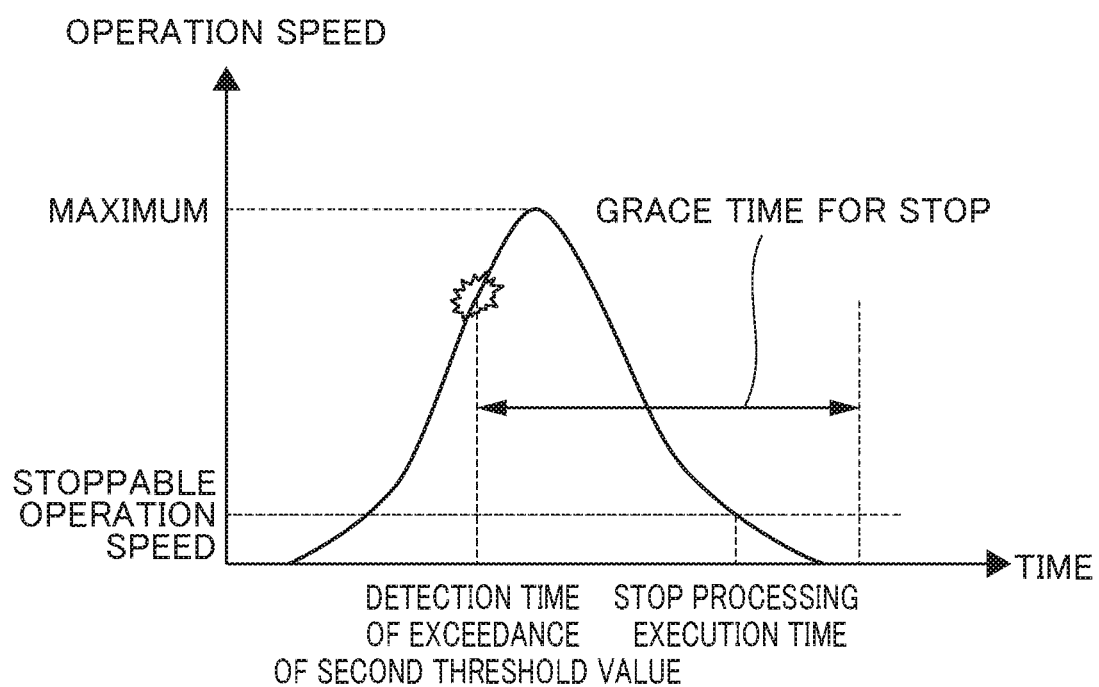
FIG. 3 is a diagram used for describing operation control of a robot by a control system of an industrial robot according to an embodiment, and shows a relationship between the operation speed of a robot and the time.

By performing the above operation control, as shown in FIG. 3, although a certain delay occurs between the timing of detecting the exceedance of the threshold and the time until the actual stop processing has been executed, it is possible to stop the processing at a lower operation speed than when executing the immediate stop processing, and it is possible to reduce the load on the robot 1.

Therefore, in the control system A of the industrial robot according to the present embodiment, when a command signal such as acceleration or jerk of the robot 1 based on the command has exceeded a second threshold set in advance, the robot 1 is stopped at a timing at which decreasing to a predetermined operation speed until the grace time has elapsed. Accordingly, when a command that applies an excessive load on the mechanical unit of the robot 1 is received, it is possible to safely stop the robot 1 while reducing the excessive load on the mechanical unit.

Therefore, according to the control system A of the industrial robot of the present embodiment, it is possible to reduce the load on the mechanical unit of the robot 1 due to the immediate stop processing at the time of abnormality detection, and the risk of premature failure due to such a load.

In particular, pick and place, which is one of the typical applications of the industrial robot 1, has a timing at which the operation speed of the robot 1 becomes a minimum at every fixed time due to the nature of a series of operations of picking a workpiece at a specific position, conveying to a specific position, and placing the workpiece. It is possible to preferably reduce the load on the robot 1 so long as applying the operation control of the present embodiment (the control system A of the industrial robot of the present embodiment) to such pick and place.

Furthermore, in the control system A of the industrial robot according to the present embodiment, the first threshold value and the second threshold value are set for each control axis of the mechanical unit of the robot 1, and by notifying the control axis for which the second threshold value has been exceeded when the robot 1 is controlled to stop according to the determination of the determination unit 5, it is possible to clearly capture and grasp on which control axis a load is acting and stop control is performed. With such a configuration, for example, it is also possible to grasp the degree of decline in durability (wear degree) or the like of each control axis.

Furthermore, in the control system A of the industrial robot of the present embodiment, by performing emergency stop of the robot 1 when it is determined that the command signal has exceeded the first threshold value, it is possible to cope with a case where it is necessary to perform emergency stop of the robot 1 preferentially to applying an excessive load on the mechanical unit of the robot 1.

Although an embodiment of the control system of an industrial robot according to the present invention has been described above, the present invention is not limited to the embodiment described above, and the present invention can be modified appropriately within a scope not deviating from the spirit thereof.

EXPLANATION OF REFERENCE NUMERALS

1 robot (industrial robot)
1*a* tool tip
2 robot controller
3 external computer
4 setting unit
5 determination unit
6 control unit
A control system of industrial robot

What is claimed is:

1. A control system of an industrial robot, the control system comprising at least one processor, the at least one processor being configured to:
    set in advance a first threshold value, a second threshold value smaller than the first threshold value, and a grace time;
    determine whether a command signal for controlling the robot has exceeded the first threshold value or the second threshold value; and
    in a case in which the command signal is determined as exceeding the second threshold value by the determination unit, stop the robot at a timing at which an operation speed of the robot becomes equal to or less than a predetermined operation speed that is determined in advance, during a period until the grace time elapses since exceeding the second threshold value.

2. The control system of the industrial robot according to claim 1, wherein the first threshold value and the second threshold value are set for each control axis of a mechanical unit of the robot, and the at least one processor notifies the control axis that has exceeded the second threshold value upon controlling to stop the robot.

3. The control system of the industrial robot according to claim 1, wherein the at least one processor performs emergency stop of the robot when it is determined that the command signal has exceeded the first threshold value.

4. The control system of the industrial robot according to claim 2, wherein the at least one processor performs emergency stop of the robot when it is determined that the command signal has exceeded the first threshold value.

* * * * *